March 9, 1965  E. F. GURNEE ETAL  3,172,862
ORGANIC ELECTROLUMINESCENT PHOSPHORS
Filed Sept. 29, 1960
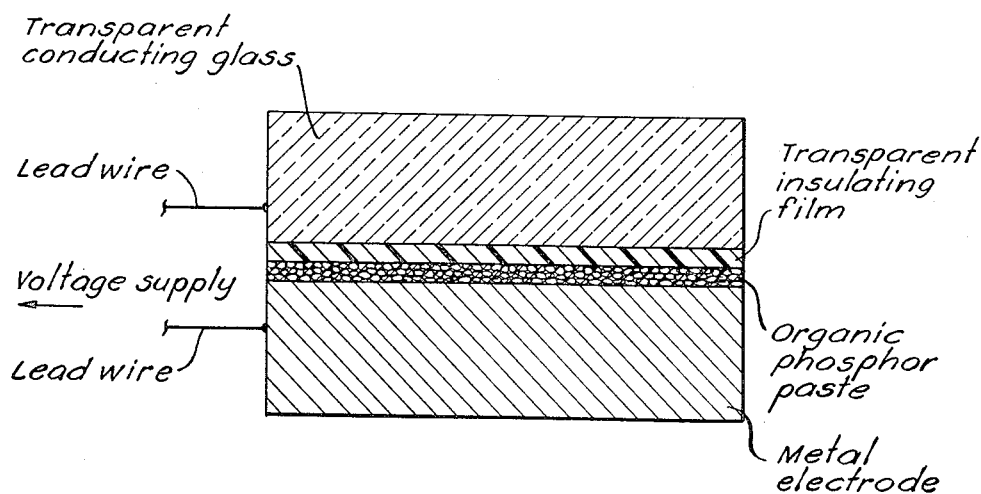
INVENTORS.
Edward F. Gurnee
Reet Teoste Fernandez
BY C. Kenneth Bjork
AGENT United States Patent Office 3,172,862
Patented Mar. 9, 1965

3,172,862
ORGANIC ELECTROLUMINESCENT PHOSPHORS
Edward F. Gurnee and Reet Teoste Fernandez, Midland, Mich., assignors to The Dow Chemical Company, Midland, Mich., a corporation of Delaware
Filed Sept. 29, 1960, Ser. No. 59,278
6 Claims. (Cl. 252—301.3)

This invention relates to electroluminescent cells and more particularly is concerned with electroluminescent phosphors prepared from cyclic organic compounds containing a conjugated ring structure, and the preparation of electroluminescent cells utilizing such phosphors therein.

Heretofore, the selection of phosphors exhibiting electroluminescence have been limited to inorganic materials, for example ZnS, ZnO:Cu, Cl; ZnS:Mn; ZnS:Cu; Mgs:Mn; CaS:Cu, to name but a few. These, and other inorganic phosphor systems are generally useful and effective, but must be prepared utilizing special and carefully controlled production procedures. Also, these inorganic phosphors undergo loss of emission with time, supposedly because of the action of water vapor on the phosphor.

It is a principal object of the present invention, therefore, to provide an electroluminescent organic phosphor.

It is a further object of the present invention to provide an electroluminescent cell, the phosphor of which can be prepared without using special procedures, such as high temperature firing under carefully controlled conditions, as now are needed to make the presently used inorganic phosphors.

It is an additional object of the present invention to provide an organic electroluminescent phosphor which has a rapid decay time as compared to that of the conventional inorganic electroluminescent phosphors.

It is another object of the present invention to provide an organic electroluminescent phosphor which can be prepared without adhering to stringent control of the impurity content of the organic materials used therein.

It is still an additional object of the present invention to provide an electroluminescent cell which exhibits a colored light preselected from a variety of available colors.

It is a further object of the present invention to provide an electroluminescent cell whose phosphor is relatively unaffected by water or water vapor.

These and additional objects and advantages will be apparent from the detailed description presented hereinafter and by reference to the accompanying drawing.

The figure in the drawing shows one embodiment of a cross-section of an electroluminescent cell utilizing a phosphor of the present invention.

The phosphor of the present invention comprises (1) a conjugated organic compound as host member, (2) a conjugated organic compound of condensed benzene rings as doping agent, or activator, and (3) a finely divided electrical conducting material. Advantageously, all of these components will be substantially uniformly dispersed, although this is not a necessity for the production of electroluminescence by the phosphor.

The phosphor host member is selected from any of a wide variety of conjugated organic compounds containing at least one benzenoid ring. Operable compounds may have in conjugated or condensed structure therewith, heterocyclic rings, one or more additional benzenoid rings, conjugated unsaturated aliphatic chains or conjugated alkaryl systems. Useful host compounds include for example naphthalene, anthracene, phenanthrene, pyrene, benzpyrene, chrysene, picene, carbazole, fluorene, biphenyl, terphenyls, quaterphenyls, triphenylene oxide, dihalobiphenyl, trans-stilbene, 1,4-diphenyl butadiene and the like.

The doping agent, or activator, to be utilized with a given host will be a conjugated benzenoid compound having at least three condensed benzene rings and generally will be a member selected from the group consisting of anthracene, tetracene and pentacene although members of other three ring or larger condensed ring systems can be employed. From about 0.0001 to about 10 percent or more weight percent of the doping agent can be used with a given host to give operable phosphors. Preferably, from about .01 to about 2 weight percent of the activator is added to the host. For optimum results, the preferred amount of activator is from about 0.03 to about 0.6 weight percent. The selection of a given doping agent to be used in preparing a phosphor will be governed by the color of light desired from the phosphor in an electroluminescent cell. For example, preparation of an electroluminescent cell containing anthracene as a doping agent will result in a blue-hued electroluminescent color. A cell wherein tetracene is utilized as the activator for the phosphor will result in a green light. A cell having pentacene as a doping agent for the phosphor will result in red-hued light upon electrical activation of the cell. A mixture of the appropriate doping agents can be used with a given host to give an electroluminescent light the color of which is the expected supplementary colors to be obtained from a mixture of the colors of the individual activators.

With host members which themselves exhibit luminescence when subjected to ultra violet light, for example anthracene, an electroluminescent phosphor can be realized by direct addition of the finely divided electrical powder to such a host without use of additional doping agent or activator. However, a brighter electroluminescence of narrower color range is produced if the host member and activator are of different structure. To illustrate, anthracene desirably will be used as a host in phosphors wherein the activator is tetracene, pentacene and similar condensed aromatic ring systems other than anthracene. Alternatively, to obtain a bright, blue electroluminescence, anthracene will be used as doping agent with a host compound other than anthracene, for example naphthalene, terphenyl, fluorene, carbazole, phenanthrene and members of other conjugated benzenoid ring systems.

The finely divided electrical conducting material which necessarily must be added to the mixture of organic host and doping agent in order to obtain electroluminescence therefrom can be selected from any one of a variety of conducting materials including for example: powdered metals, powdered metal oxides, powdered metal sulfides, carbon, and other materials with appreciable conductivity. For most practical applications, finely divided carbon preferably will be utilized in the preparation of the phosphors for the electroluminescent cells of the instant invention.

Generally, from about 0.4 to about 1.5 percent by weight of the finely divided electron conducting material will be utilized in the phosphors of the instant invention. However, as little as about 0.15 weight percent and as much as about 4.5 percent by weight or more of the powdered conductor can be incorporated into the phosphors of the instant invention.

In preparing the electroluminescent phosphor, good color is obtained if the components, i.e. host, doping agent and electrically conducting powder, are mixed intimately together by grinding these to a finely divided state either alone or in the presence of an inert carrier. However, increase in electroluminescent color production is found if the host and doping agent are first cocrystallized from a solvent and the electrically conducting powder then mechanically admixed thereinto by a grinding operation as described heretofore. The optimum in colored light production is obtained if all three materials are mixed together and the organic members then are heated to the molten state and allowed to cocrystallize through cooling. As an alternative to this latter method, the host and doping agent first can be cocrystallized from a suitable solvent such as benzene, toluene, xylene, acetone, alcohols, and the like, and the finely divided electrical conducting material then be mixed with the so-produced crystals. This resulting mixture again can be heated till the organic materials melt and the mixture of fluid host and activator plus solid electrical conducting powder then be allowed to cool till the host and doping agent, with conducting powder dispersed therethrough, again crystallize.

The actual preparation of an electroluminescent cell as shown by the embodiment in the figure can be illustrated as follows: A paste of a cocrystallized host member, (e.g. anthracene) and activator (e.g. tetracene) along with the finely divided electrical conducting powder (e.g. carbon) is prepared by grinding the components together. The paste utilizes as a carrier a small amount of an inert material such as transformer oil, silicone oil or other similar material having a high resistance to breakdown when subjected to electrical potentials. A thin layer, up to about 0.01 inch thick, of the paste as prepared is placed on a conducting metal plate. A thin layer or film (from about .0005 to .001 inch thick) of a transparent, insulating material, e.g. mica, polystyrene, Mylar (a trademarked product of E. I. du Pont de Nemours & Co.), polyethylene etc. is placed on top of the phosphor. This insulating material in turn is covered either with a transparent, electron conducting glass, or similar transparent conducting material or a transparent ionic conductor. Lead wires from a voltage supply are affixed to the cell, one wire to the metal plate and the other to the transparent conducting material thereby completing the cell.

Alternatively, instead of preparing the phosphor as a paste, the cocrystallized or individual phosphor host and activator materials can be placed directly on the plate-like metal electrode. This plate with crystals thereon then can be heated, for example on a hot plate, which is held at a temperature above the melting point of the mixture of organic crystalline materials. The materials are allowed to melt, at which time a weighted material such as a Pyrex glass plate is placed on top of the resulting fluid thereby forcing this fluid to cover the entire metal electrode surface in a thin layer. The entire unit then is removed from the hot plate and allowed to cool whereupon the crystal mixture solidifies and hardens into a thin solid layer on the electrode surface. The weighted glass plate is then removed and the electrical conducting powder placed on top of the so-produced organic layer to complete the electroluminescent phosphor. The cell is then completed as described heretofore.

It is to be understood that in preparing a cell by this latter method the finely divided electrical conducting material can be admixed with the host and activator prior to placing these on the metal electrode or prior to the formation of the molten layer of these on the electrode. In this case, it is unnecessary to add additional amounts of the electrical conducting powder on top of the so-produced phosphor layer.

It is to be understood further that the phosphor can be embedded or dispersed within a thin film of a solid dielectric, such as ceramic, plastics and the like to provide a substantially transparent layer. This then can be placed on the electrode and the cell completed as described heretofore.

The thickness of the phosphor layer to be utilized in the instant electroluminescent cells is not fixed but can be varied depending upon the voltage supply available. The amount of voltage to be impressed upon the cell to generate electroluminescence therein is in direct relationship to the thickness of the phosphor layer. To illustrate, with a phosphor layer about 0.001 inch thick, good electroluminescence is obtained using a potential of about 800 volts at 2000 cycles per second. If the thickness of the phosphor layer is increased to about 0.01 inch, the voltage necessary to excite the cell will be about 8000 volts. With thinner phosphor layers, correspondingly reduced potentials will give the desired electroluminescence. For most practical applications ordinarily the thickness of the phosphor layer will not exceed about 0.005 inch. Preferably, these will be as thin as possible, about 0.0001 inch, and still give complete coverage of the conducting electrode plate.

Although the particular cell design described herein and shown in the drawing is very useful, it is to be understood that the new and novel phosphors of the instant invention can be used in any of the conventional electroluminescent cells now known.

The following examples will serve to illustrate further the present invention, but are not meant to limit it thereto.

*Example 1*

A mixture of anthracene (host) and about 0.1 percent by weight of tetracene (doping agent) was dissolved in hot benzene and the resulting solution subsequently evaporated to dryness. A mixture of the crystals and a small amount of carbon powder, about 1 percent by weight of the total composition were ground into a thick paste using a silicone oil as a carrier. The resulting phosphor mixture was just slightly grayish in color. A 0.001 inch thick layer of the so-produced electroluminescent phosphor paste was placed onto a flat chrome-plated electrode. This paste was covered with about a 0.001 inch thick sheet of a transparent polystyrene film. This film in turn was covered with a transparent conducting glass. A lead wire was attached to the metal plate and a second wire affixed to the transparent conducting glass. A potential of about 800 volts at about 2000 cycles per second was applied to the cell whereupon a green light was observed emanating through the glass plate.

In a comparative study, a similar mixture of the anthracene and the tetracene crystals, but containing no carbon powder, was made into a paste using the silicone oil as carrier. This paste was utilized in an electroluminescent cell prepared as described above. Application of 800 volts at 2000 cycles per second upon this cell gave no electroluminescence.

*Example 2*

Cocrystals of a mixture of anthracene and about 0.3 percent by weight pentacene were prepared from benzene as described in Example 1 above. Some of the dry crystals were mixed with about 0.8 weight percent of finely divided carbon and this mixture was placed on a smooth brass metal electrode plate. The electrode was placed on a hot plate maintained at a temperature slightly above the melting point of the anthracene-pentacene mixture. As the crystals started to melt, they were covered with a piece of Pyrex glass that previously had been heated to a temperature slightly above the melting point of the mixture. The metal plate, fluid layer and glass cover were removed as a unit from a hot plate, placed on an insulating surface and left to cool to room temperature. A weight was placed on the glass cover during this cooling operation. After the assembly had cooled to room temperature, the glass and weight were removed and there was found a thin, uniform layer about 0.001 inch thick, of "doped" anthracene held to the metal electrode. The cell was then assembled using an insulating layer of about 0.001 inch Mylar, conducting glass and lead wires as described for the cells prepared in Example 1. A small amount of insulating oil was also placed on all contacting surfaces to insure against electrical breakdown in the event a small amount of air might be present between these layers. As the potential of 800 volts at 2000 cycles per second was applied to this cell, red electroluminescent light was obtained.

In a manner described for the foregoing examples, electroluminescent cells giving bluish-hued light can be prepared utilizing a 0.01 inch thick layer of a phosphor having phenanthrene as host, about 10 percent by weight anthracene (based on phosphor weight) as activator and about 1.5 percent by weight (based on phosphor weight) powdered silver. Reddish-hued electroluminescence will result from a cell having a .0001 inch thick layer phosphor with p-terphenyl as host, about 0.01 percent weight pentacene (based on phosphor weight) as doping agent and about 0.5 percent powdered copper as electrical conductor (based on phosphor weight).

A greenish-hued electroluminescent cell can be produced utilizing a 0.005 inch thick phosphor layer containing trans-stilbene as the host crystal, about 0.001 weight percent of tetracene as activator and 4.5 weight percent finely divided carbon. (Weights based on total phosphor weight.)

Additionally, naphthalene as host can be mixed with about 0.1 weight percent pentacene in the presence of about 1 weight percent copper oxide to give an electroluminescent phosphor giving off reddish-hued light.

p-Quaterphenyl with about 0.3 weight percent anthracene as activator and in admixture with about 0.15 weight percent finely divided carbon gives a bluish-colored electroluminescent phosphor.

Similarly, chrysene with about .01 weight percent tetracene as doping agent and about 1 weight percent finely divided aluminum powder will give an electroluminescent phosphor producing green light upon activation.

Other useful host members include, for example: p,p′-dichlorobiphenyl; p,p′-dibromobiphenyl; p,p′-diiodobiphenyl; m-diphenylbenzene; 1,3,5-triphenylbenzene; 2,5-di(p-biphenyl)-oxazole; p, di(5-phenyl-2-oxazolyl)benzene; $\alpha,\alpha'$-binaphthyl- $\beta,\beta'$-binaphthyl; 1,4-diphenylbutadiene; tetraphenyl ethylene; 1,2-di($\alpha$-naphthyl)-ethylene; 1,2-di($\beta$-naphthyl)-ethylene; sym-diphenyl acetylene; 2,5-diphenyl oxazole; pyrene; 1,2,7,8-dibenzphenanthrene; triphenylene; fluoranthene; o-terphenyl; m-terphenyl; p-quaterphenyl; triphenylene; triphenylene oxide; fluorene; carbazole; N-ethylcarbazole; biphenyl; perylene; 1,2-benzathracene; 1,2,5,6-dibenzathracene.

In the preparation of electroluminescent phosphors of the instant invention it is understood that any of the host members listed herein can be utilized with any of the activators mentioned containing any one of the finely divided electrical conducting materials contained therewith.

The selection of a given activator for use to prepare a phosphor will be governed only by the hue of the electroluminescent colors desired from the phosphor.

Various modifications can be made in the compositions of the instant invention without departing from the spirit or scope thereof for it is understood that we limit ourselves only as defined in the appended claims.

We claim:
1. An electroluminescent phosphor which comprises by weight; from about 99.85 to about 85.5 of a conjugated organic compound host member selected from the group consisting essentially of,
   (a) naphthalene
   (b) anthracene
   (c) phenanthrene
   (d) pyrene
   (e) benzpyrene
   (f) chrysene
   (g) picene
   (h) carbazole
   (i) fluorene
   (j) biphenyl
   (k) terphenyls
   (l) quaterphenyls
   (m) triphenylene oxide
   (n) dihalobiphenyls
   (o) trans-stilbene, and
   (p) 1,4-diphenyl butadiene,
from about 0.0001 to about 10 percent of a conjugated benzenoid compound activator selected from the group consisting essentially of,
   (a) anthracene
   (b) tetracene, and
   (c) pentacene
said activator being further characterized in that in said phosphor it is a different compound than said host member and from about 0.15 to about 4.5 percent of a finely divided electrical conductor selected from the group consisting essentially of,
   (a) metals
   (b) metal oxides
   (c) metal sulfides, and
   (d) carbon,
the components of said phosphor being in intimate contact and there being substantially uniform dispersion of said components throughout said phosphor.

2. An electroluminescent phosphor which comprises by weight; about 99.1 percent anthracene, about 0.1 percent tetracene and about 0.8 percent finely divided carbon, the components of said phosphor being in intimate contact and there being substantially uniform dispersion of said components throughout said phosphor.

3. An electroluminescent phosphor which comprises by weight; about 98.7 percent phenanthrene, about 0.3 percent anthracene and about 1 percent finely divided carbon, the components of said phosphor being in intimate contact and there being substantially uniform dispersion of said components throughout said phosphor.

4. An electroluminescent phosphor which comprises by weight; about 98.5 percent trans-stilbene, about 0.6 percent pentacene and about 0.9 percent finely divided carbon, the components of said phosphor being in intimate contact and there being substantially uniform dispersion of said components throughout said phosphor.

5. An electroluminescent phosphor which comprises by weight; about 98.97 percent fluorene, about 0.03 percent tetracene and about 1 percent finely divided carbon, the components of said phosphor being in intimate contact and there being substantially uniform dispersion of said components throughout said phosphor.

6. An electroluminescent phosphor which comprises by weight; about 98.5 percent carbazole, about 0.5 percent anthracene and about 1 percent finely divided carbon, the components of said phosphor being in intimate contact and there being substantially uniform dispersion of said components throughout said phosphor.

References Cited in the file of this patent
UNITED STATES PATENTS

| | | |
|---|---|---|
| 2,733,367 | Gillson | Jan. 31, 1956 |
| 2,755,406 | Burns | July 17, 1956 |
| 2,910,472 | Siegrist et al. | Oct. 27, 1959 |

FOREIGN PATENTS

| | | |
|---|---|---|
| 1,022,100 | France | Dec. 10, 1952 |

OTHER REFERENCES

"Electroluminescence of Organic Compounds," Bernanose, British Journal of Applied Physics, Supplement No. 4, pages S54–S56.

Finar: Organic Chemistry, volume 1, Longmans, Green and Co. Ltd., London, 1963, pages 726, 727, 729 and 737.